…

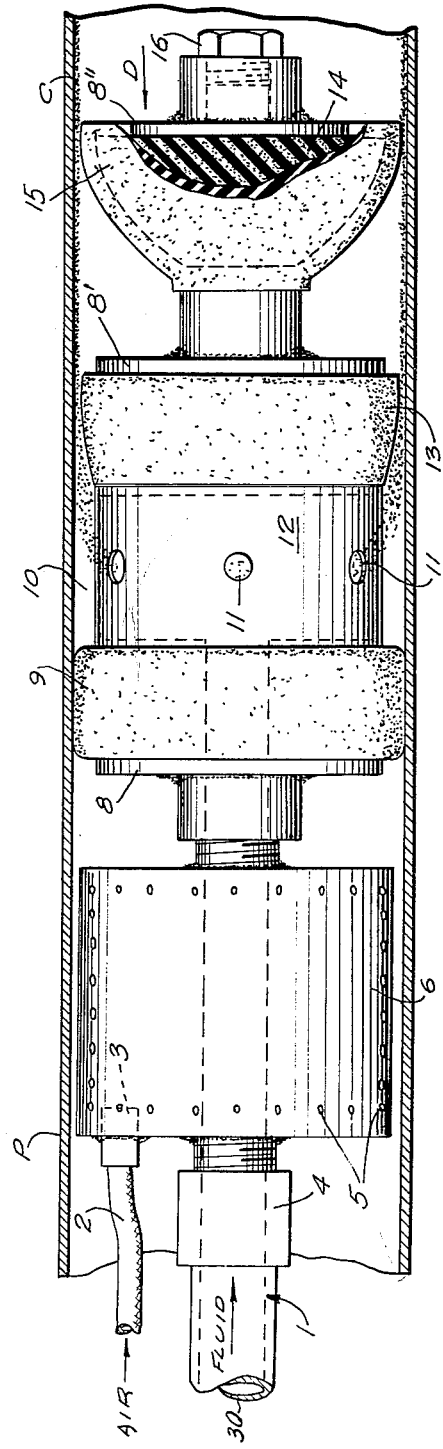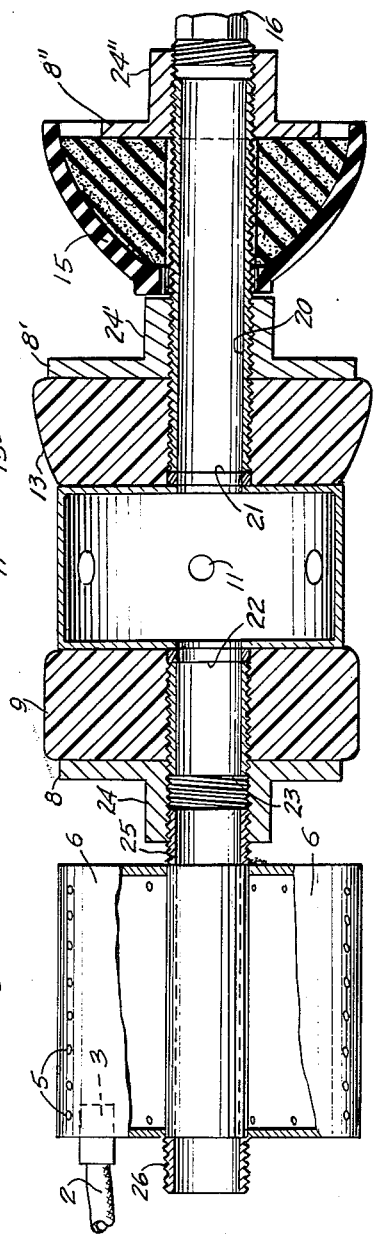
Nov. 19, 1963     J. W. WEAVER     3,111,431
INTERIOR PIPE COATING DEVICE
Filed March 24, 1958
FIG. 1
FIG. 2
INVENTOR
Jack H. Weaver

United States Patent Office 3,111,431
Patented Nov. 19, 1963

---

3,111,431
INTERIOR PIPE COATING DEVICE
Jack W. Weaver, Box 1584, Tulsa, Okla., assignor of fifty percent to B. L. Weaver, Jr., Tulsa, Okla.
Filed Mar. 24, 1958, Ser. No. 723,378
4 Claims. (Cl. 118—105)

It has long been the practice to apply internal coatings to pipe, gas, and salt water pipe lines by conventional methods; however, with the advent of the relatively new group of coal-tar epoxy coatings, existing application methods have proved to be impractical. Coal-tar epoxy coatings are thixa-tropics with a mean specific gravity of 1.25 and the minimum application should be 12 mils (.012) inch dry film. As far as is known, existing applications for interior pipe coating with coal-tar epoxies consist of spraying with several thin mil film coats in order to achieve the minimum dry film thickness of 12 mils (.012). This requires long drying periods with heat between coats and also requires handling the pipe several times and has proved to be inexpensive, impractical and time consuming.

It is therefore the object of my invention to provide a coating device for internal coatings, using coal-tar epoxies and the like, and which avoids the difficulties mentioned, namely, the application of coal-tar epoxy coatings and the like in one application, the end result being a coating with a minimum dry mil film thickness of 12 mils (.012) inch, thoroughly and yet quickly and inexpensively.

My invention provides for a coating device made up of the following basic component parts; an annular resilient closure means 9 and preferably with rounded corners is composed of chemical resistant rubber for example, of 50 durometer. This annular closure means 9 is expanded slightly larger than the pipe to be coated by a front compression collar 8. Adjacent to the annular closure means 9 is the annular gauge means 13, which is circular in shape and with a beveled or inclined leading corner and composed of chemically resistant rubber of 50 durometer. The annular gauge means 13 is smaller than the pipe to be coated and is backed up by a center collar 8' which when turned or screwed in one direction slightly, will cause the rubber gauge means to expand.

The annular resilient closure means 9 and the annular gauge means 13 are separated by a bronze chamber which has fluid openings 11 therein communicating with the opening in the fluid boom 1. The section between the annular resilient closure means 9 and the annular gauge means 13 creates a reservoir with the pipe walls for the introduction of the coating material under 100 p.s.i. The annular gauge means 13 which is backed up by the center compression collar 8' for controlling the film thickness is adjustable. Immediately following the annular gauge means 13 and compression collar 8' is the second end portion gauge means 15 which is cup-shaped and of chemically resistant rubber of, for example, 50 durometer. This second end portion gauge means determines the ultimate mil thickness of the coatings. The gauge means 15 is filled with a half sponge ball which in turn is backed up by a rear compression collar 8''. The fluid boom 1 is sealed at the right end by the standard pipe plug 16 threadedly connected with the portion 24'' of the flange 8''.

Yet another feature of my invention is the provision for tubular shaped aluminum air chamber which is necessarily smaller than the pipe being coated. Peripherally distributed around the air chamber are a series of equi-distantly spaced openings to provide air jets. The air centering chamber is substantially centered and spatially disposed from the pipe 6 and sealed around the fluid boom, having an air inlet opening in one end. Compressed air is admitted to the centering chamber 6 at, for example, 125 p.s.i. and immediately ejects air from the air jets into the tube creating equal centering pressure for the air centering chamber. The air centering chamber is rigidly connected to the coating device per se, therefore substantially centering the coating device per se in the pipe therein as all basic components of the coating device are centered and mounted on the fluid or coating material supply boom.

The invention consists of certain novel features of construction and organization of parts hereinafter fully described and claimed and in order that the same may be fully understood, reference is to be had to the accompanying drawings, illustrating one form of a practical embodiment of the invention.

FIGURE 1 is a partial elevation of the coating apparatus within the pipe to be coated;

FIGURE 2 is a longitudinal section of FIGURE 1, shown partially in elevation.

Continuing with a more detailed description of the drawings, the work piece or pipe P is shown in the process of being coated. The sense of movement of the coating device is indicated by the letter D. Coating material is represented by the reference character C.

In operation, the fluid boom 1 and air line 2 are normally longer than the pipe to be coated, and the boom is connected to a pressure paint pot coating material source which is mounted on an electric powered traveling cart.

Compressed air under 125 p.s.i. is admitted to the air line A, thereby flowing into the centering chamber 6, and emitted from the air jet ports 5. The jets of air create equal pressure between the centering chamber 6 and the inner surface of the pipe or tube and pneumatically centers the centering chamber 6 to centrally guide the entire device of the apparatus. The series of equi-distantly spaced longitudinal or circumferential ports 5 in the centering chamber provides a multiplicity of ports so that they act as jet ports to create a pressure barrier between the centering chamber and the inner surface of the pipe P, so that the centering chamber is centered in the tube by the escaping air which pushes the pressure chamber away from the pipe inner surface at all points, thereby centering the centering chamber, supporting one end of the tool or coating material device, within but spaced from the work piece at all points.

The coating material under 100 p.s.i. flows into the fluid boom 1 thence into the distributing chamber 12, through the coating material inlet opening or ports 11, and is then forced into the reservoir 10 of the coating material distributing chamber 12. The annular closure means 9, which controllably fits snugly against the inner surface of the pipe, forces the coating material to flow past the annular gauge means 13 having an outer resilient peripheral edge spaced from the inner surface or wall of the work piece tube, and adapted to provide an annular coating material passage therebetween for depositing a layer of the coating material on the inner surface of the work piece or pipe P, as the device and the pipe or tube are moved relative to each other, and thence past the second end portion gauge means 15, which determines the final mil film thickness. Instant and accurate adjustments of the annular resilient closure means 9, the annular gauge means 13 and the second end portion gauge means 15 can be made by the threaded compression collars 8 for varying the diameter of the outer peripheral edge of the respective associated resilient elements.

The concave section of the second end portion gauge means 15 is axially aligned with the other gauge means and also including an outer resilient peripheral edge spaced from the inner wall of the tube adapted to provide a second annular passage therebetween for varying the final inside diameter of the deposited layer of coating material as relative motion is provided between the device and the surface coated. The concave section of the second end portion gauge means 15 houses a half sponge ball 14, which is in turn adjustably compressed by the rear compression collar 8″. The fluid boom 1 is sealed at the end by a headed bolt or pipe plug 16. The end portion gauge means 15 has the smaller diameter thereon abutting the sleeve portion 24′ of the compression collar 8′ which acts as a stop so that tightening of the compression collar 8″ will compress the second end portion gauge means 15 to increase its diameter.

There are three compression collars, namely front compression collar 8, in front of annular closure means 9 adjustable to prevent or restrict the coating material from escaping forwardly. Center compression collar 8′ is adjustable by being threadedly movable on the boom 1 nipple 20 to fix the spacing between the annular gauge means 13 and the inner surface of the tube on pipe P, and a rear compression collar 8″ is adjustable by being threadedly movable, also, on nipple 20 to control the spacing between the final or second end portion gauge means and the surface of the tube or pipe P. In normal operation, closure 9 is always in contact with the tube, but gauge means 13, and the end portion gauge means do not touch the surface of the pipe, but are spaced therefrom to provide two discrete gauge means adjusted to be normally spaced from the tube inner surface at all times. Since only one closure means is used, closure means 9, the centering chamber 6 is employed for some coatings, but may be omitted in other cases, depending on the characteristics of the coating material used, diameter of pipe, and thickness of coating material applied.

Nipple 20 of boom 1 is a portion of pipe threaded on the outside thereof and secured to the hub 21 positioned on the right side of the collecting chamber 12. A hub 22 similar to hub 21 is secured to the left side of the collecting chamber 12. A nipple 23 somewhat shorter than the nipple 20 is secured to the hub 22. The hub 25 of the centering chamber 6 is threaded and forms a nipple portion so that the threaded portion 24 of the flange 8 will be coupled to the free end of the threaded hub 25 and the free end of the nipple 23. The flange 8′ and 8″ have threaded portions 24′ and 24″ respectively thereon with the flanges 8′ and 8″ being independently movable to the left or right for compression of the respective gauges 13 and 15. The pipe bolt 16 is threadedly connected to the free end of the threaded portion 24″ so that the coating material which normally flows through the inlet port of the annular closure means 9 will be prevented from escaping from the free end of the boom via nipple 20 and threaded portion 24″. Hub 26 on the left-hand side of the centering chamber is threaded similar to the hub 25 so that it will be possible to threadedly connect the boom 1 thereto by means of a coupling or collar 4 shown in FIGURE 1. The boom 1 extends through the length of pipe to be coated and as the boom 1 moves to the left the coating material will flow into the reservoir and be restricted from movement to the left beyond the resilient portion of the annular closure means 9. The coating material from the reservoir will be smoothed completely around the surface adjacent the resilient peripheral edge of the annular gauge means 13. By holding the flange 8 stationary and rotating the chamber 12 to compress the resilient material engaging the nipple 8, the resilient material 9 will be increased in diameter. Obviously, the chamber 12 may be held stationary and the flange 8 rotated. Whichever one is held stationary will depend on the position of the flange 8 and the diameter desired of the resilient member. The smaller portion of the end portion gauge means 15 uses the flange 8′ as a limiting element. Accordingly, any change of the position of the flange 8′ would alter the diameter of the second annular gauge means 15 and would, naturally, require observation and possibly control for the particular diameter desired.

Air tube 2 feeds air to the centering chamber, from a compressor or other conventional air pressure source.

The coupling 4, threadedly connects the coating material supply fluid boom tube 30 to the device for feeding the coating material to the reservoir 10, and for moving the device through the tube or pipe P.

Normally, the distributing chamber 12 is stationarily affixed on the boom extension, but in communicating relation for the coating material flow. The front compression collar 8 and center compression collar 8′ are independently movable, to respectively control compression of the closure means 9 and the annular gauge means 13. Likewise, compression collar 8″ is normally independently movable to compress or release compression on the end portion gauge means 15. Obviously, the collars 8, 8′ and 8″ must be independently controllable to obtain different settings of spacing of the respective gauge means from the inner pipe surface to progressively control the thickness of the coating material when the device is in operation.

It is to be understood that the boom 1 includes the pipe end to which the plug 16 is affixed, and all intermediate elements supported thereby as a unit, as shown in FIGURES 1 and 2. The boom includes all elements shown in FIGURE 1 or 2 and embraces the threaded portions between the centering chamber 6, and the coating apparatus per se, including the closure means 9, the collecting chamber 12, the annular gauge means 13, the second end portion gauge means 15 and the compression collars 8, 8′, and 8″. The centering chamber 6 is also a part of the boom.

While the operation is disclosed above as a coating operation using coal tar epoxy coatings, it will be clear that the device and method are well suited to such modifications and it is intended to include such an operation within the term coating as used herein.

I therefore particularly point out and distinctly claim as my invention:

1. Apparatus for applying fluid coating material to the interior surface of a tube comprising, a longitudinally movable resilient annular closure means having fluid material inlet means and being movable within a tube to be coated, said annular closure means being imperforate except for said inlet means and of an outside diameter to engage said interior surface for restricting the flow of the coating material ahead of the annular closure means as the apparatus is moved within said tube to coat the inner surface thereof, resilient annular gauge means, chamber means having outlet port means communicating with said inlet means and fixedly coupled intermediate said annular closure means and said annular gauge means and axially movable therewith, said annular closure means and said annular gauge means defining end portions of a coating material reservoir formed externally of said chamber within the tube when the apparatus is in use for receiving the coating material through said outlet port means only from internally of said chamber means, said annular gauge means including an outer peripheral edge spaced from the inner wall of the tube to be coated when the apparatus is in use and adapted to provide an annular coating material passage therebetween for depositing a layer of predetermined thickness of the coating material on the inner surface of the tube from said reservoir as the apparatus and the tube are moved relative to each other.

2. Apparatus as set forth in claim 1, wherein said annular gauge means includes means for varying the diameter of the outer peripheral edge thereof for controlling the size of the annular passage between said outer peripheral edge of the gauge means and the inner surface of the tube to be coated for controlling the thickness of the coating material deposited thereon.

3. Apparatus as set forth in claim 1, wherein an end portion second gauge means is coupled to and axially aligned with first said gauge means, each of said gauge means including an outer peripheral edge spaced from the inner wall of the tube to be coated and each providing an annular passage therebetween for progressively decreasing the inside diameter of the deposited layer of coating material as the gauge means of the apparatus and the tube are moved relative to each other.

4. Apparatus as set forth in claim 1, and wherein said reservoir includes the chamber means having a plurality of openings equidistantly spaced circumferentially about said chamber means for communicating with the inlet port means to provide an annular uniform pattern of coating material within the chamber ahead of the annular gauge means as the coating apparatus and the tube are moved relatively.

References Cited in the file of this patent

UNITED STATES PATENTS

| | | |
|---|---|---|
| 1,746,071 | Cotton | Feb. 4, 1930 |
| 1,787,126 | Steinnes | Dec. 30, 1930 |
| 2,146,305 | Link | Feb. 7, 1939 |
| 2,194,701 | Harrison | Mar. 26, 1940 |
| 2,261,928 | Perkins et al. | Nov. 4, 1941 |
| 2,297,099 | Crom | Sept. 29, 1942 |
| 2,362,881 | Canney et al. | Nov. 14, 1944 |
| 2,377,615 | Crane | June 5, 1945 |
| 2,427,632 | Stephern | Sept. 16, 1947 |
| 2,428,292 | Queen | Sept. 30, 1947 |
| 2,480,358 | Curtis et al. | Aug. 30, 1949 |
| 2,617,134 | Barton | Nov. 11, 1952 |
| 2,695,593 | Sollanie | Nov. 30, 1954 |
| 2,707,934 | Curtis | May 10, 1955 |
| 2,713,908 | Curtis | July 26, 1955 |
| 2,852,080 | Roach | Sept. 16, 1958 |
| 2,856,004 | Badger | Oct. 14, 1958 |
| 2,950,702 | Ferguson et al. | Aug. 30, 1960 |

FOREIGN PATENTS

| | | |
|---|---|---|
| 500,664 | Belgium | Feb. 15, 1951 |
| 311,319 | Great Britain | July 7, 1930 |
| 380,451 | Great Britain | Aug. 24, 1932 |